United States Patent
Nuss et al.

(10) Patent No.: US 9,167,444 B2
(45) Date of Patent: Oct. 20, 2015

(54) METHOD FOR MANAGING HETEROGENEOUS CELLULAR NETWORKS

(71) Applicant: CISCO TECHNOLOGY, INC., San Jose, CA (US)

(72) Inventors: Ziv Nuss, Tzur Yigal (IL); Itay Meir Mizrahi, Ness-Ziyonna (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 56 days.

(21) Appl. No.: 13/693,434

(22) Filed: Dec. 4, 2012

(65) Prior Publication Data

US 2014/0153439 A1 Jun. 5, 2014

(51) Int. Cl.
*H04W 24/02* (2009.01)
*H04W 84/04* (2009.01)

(52) U.S. Cl.
CPC ............ *H04W 24/02* (2013.01); *H04W 84/045* (2013.01)

(58) Field of Classification Search
CPC . H04W 16/02; H04W 84/10; H04W 52/0248; H04W 56/0095; H04W 36/22; H04W 52/343; H04W 72/04
USPC .......................................... 370/328–331, 317
See application file for complete search history.

(56) References Cited

U.S. PATENT DOCUMENTS 8,694,044 B2 * 4/2014 Hiltunen et al. ............... 455/522
8,874,126 B2 * 10/2014 Jeong et al. ................. 455/452.2
2010/0093358 A1 * 4/2010 Cheong et al. ............... 455/444
2011/0039539 A1 2/2011 Maida et al.
2012/0015655 A1 1/2012 Lee
2013/0079007 A1 * 3/2013 Nagaraja et al. ............. 455/436

FOREIGN PATENT DOCUMENTS

| EP | 2445265 | 4/2012 |
|---|---|---|
| WO | WO2010/125151 | 11/2010 |
| WO | WO2014/087392 | 6/2014 |

OTHER PUBLICATIONS

PCT Jun. 16, 2014 International Search Report and Written Opinion of the International Searching Authority for International Application Serial No. PCT/IL2013/000085.
EPO Aug. 12, 2014 Extended EPO Search Report and Opinion from European Application Serial No. 13195780.8.

(Continued)

*Primary Examiner* — Shaq Taha
*Assistant Examiner* — Sasha Cintron Pacheco
(74) *Attorney, Agent, or Firm* — Patent Capital Group

(57) ABSTRACT

A method is provided for managing heterogeneous cellular networks. The method comprises obtaining measurement reports from wireless entities relating to the intensity at which signals are received by each wireless entity; based on these measurement reports, and/or on geographical information of HetNet elements, identifying a macro cell located at the vicinity of the small cells; selecting one of the small cells to be a gateway cell, and other small cells to be inner cells. The gateway cell is a small cell that receives, or mobile terminals connected thereto receive, signals transmitted by the macro cell at an intensity being at least similar to intensity at which these signals are received at the inner cells; identifying physical layer identifiers (PLIs) used at the macro cell; and determining PLIs for the gateway cell which are not currently used by the macro cell, and PLIs available for use by the inner cells.

17 Claims, 5 Drawing Sheets

(56) References Cited

OTHER PUBLICATIONS

"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.

"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," $3^{rd}$ Generation Partnership Project, Mobile Competence Centre; 650, Route Des Lucioles; F-06921 Sophia-Antipolis Cedex; France; Sep. 2012, 205 pages.

"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," $3^{rd}$ Generation Partnership Project, Mobile Competence Centre; 650, Route Des Lucioles; F-06921 Sophia-Antipolis Cedex; France; Sep. 2012, 21 pages.

"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.

\* cited by examiner

METHOD FOR MANAGING HETEROGENEOUS CELLULAR NETWORKS

TECHNICAL FIELD

The invention relates to a system and a method for managing wireless networks, and in particular to management of heterogeneous cellular networks.

BACKGROUND

In current cellular mobile broadband systems the achievable data rates are strongly dependent on the users' positions in the network.

In order for wireless networks operators to solve one of their biggest problems—how to get more signal strength where one needs or wants it most, the operators have started in the recent years to deploy their own or rely on end users to buy very small Base Stations, in order to meet the increasing demand for data traffic. This new type of cell sites, referred to hereinbelow as "small cells" or "metro cells", used in conjunction with wireless cells of the traditional cellular networks (macro cells). Networks that include both macro cells and metrocells are referred to herein as heterogeneous networks (HetNets).

The term "small cells" as used herein and throughout the specification and claims encompass femtocells, picocells microcells and metrocells. Small-cell networks can also be realized by means of distributed radio technology consisting of centralized baseband units and remote radio heads. Beamforming technology (focusing a radio signal on a very specific area) can be utilized to further enhance or focus small cell coverage. A common factor in all these approaches to small cells is that they are centrally managed by mobile network operators.

Small cells provide a small radio footprint, which can range from 10 meters within urban and in-building locations to 2 km for a rural location.

According to the solution being adopted by the operators, the end-users may buy small devices that are personal cellular base stations. The device typically has an antenna to boost the available signal as well as an Internet connection. The device uses the end user Internet connection to connect to the service provider's network and to route the user's phone calls.

As will be appreciated by those skilled in the art, scenarios that entail an overlapping deployment, while using the same or adjacent frequency channels, between two (or more) cells of the same or different types (e.g. macro, metro etc.) are possible.

The problem yet to be solved is how to enable efficient simultaneous operation of both macro cells and small cells where the latter are located within area covered by the macro cell, while providing the same user experience across the whole cellular network (or even better) in order to satisfy the users' expectations, and at the same time, while the macro cell can be unaware of small cells being operative within its range.

One of the problems associated with such a deployment is that along with the expected densification of small cells' deployments, there is a rapid increase in the number of physical layer identifiers ("PLI"s) that are used in modern cellular technologies to identify the Base Station for mobile terminals. Examples of such identifiers are PCI in LTE compatible systems and primary scrambling codes ("PSC"s) in UMTS compatible networks, or any other applicable physical layer identifiers in systems that are compatible with other International Standards. However, as the number of possible PLIs is limited, the probability of having PLI collision within the small cell grid, as well as between the small cells and the macro network, increases significantly. A large number of small cells effectively preclude the network operator from being able to manually assign PLIs to the various small cells. Therefore, the present invention seeks to provide a solution by which the PLIs may be allocated automatically and reassessed periodically in order to avoid PLI collisions at times when changes in network conditions occur.

SUMMARY OF THE DISCLOSURE

The disclosure may be summarized by referring to the appended claims.

It is an object of the present invention to provide a method and apparatus to enable automatic and/or dynamic mass deployment of small cells.

It is another object of the present invention to provide a method and apparatus to enable dynamic management of neighbor lists in macro cells that play essential role in reselection of the small cells by UEs connected to or camping on the macro cells.

It is still another object of the present invention to provide a method and apparatus to enable hand-in from the macro cells to the small cell grid via grid gateway cells, by creating non-ambiguous neighbor relations to the grid gateway cells.

It is yet another object of the present invention to provide a method and apparatus to enable optimizing hand-out process from the small cells to the macro network by automatic tuning of neighbor lists in the small cells based on macro network visibility.

It is still another object of the present invention to provide a method and apparatus to enable dynamically managing the PLI allocation across the small cells and the macro cells.

It is yet another object of the present invention to provide a method and an apparatus to enable mass deployment of small cells while providing them with an optimal PLI list, to be used by each of the small cells. For example, by allocating a list of PLIs to be used by a grid of small cells, say, a list of 5 for 20 cells, while each gateway cell gets a single individual PLI assigned thereto.

Other objects of the present invention will become apparent from the following description.

According to a first embodiment there is provided a method for managing a heterogeneous cellular network ("HetNet") comprising one or more macro cells and a first plurality of small cells, wherein the method comprises the steps of:

providing a second plurality of small cells belonging to the first plurality of small cells;

obtaining information that pertains to geographical relationship between at least one of the one or more macro cells and the second plurality of small cells;

based on the information obtained, identifying at least one macro cell from among the one or more macro cells, located at a geographical vicinity of at least one of the second plurality of small cells, preferably, at a geographical vicinity of at least most of the second plurality of small cells;

selecting at least one small cell from among said second plurality of small cells to be a gateway cell, and selecting at least one other small cell of the second plurality of small cells to be an inner cell, and wherein the selection of the at least one cell as a gateway cell is based upon reception intensity at which communication signals transmitted by a base station located at the at least one macro cell identified, are received;

identifying physical layer identifiers ("PLI"s) assigned to the at least one macro cell identified;

for a frequency carrier at which the gateway cell is operative, determining one or more PLIs available for use by the gateway cell, wherein the one or more available PLIs are not currently used by the base station of the at least one macro cell at that frequency carrier;

determining one or more PLIs available for use by the at least one inner small cell; and selecting for each of the at least one gateway cell and for each of the at least one inner cell, a PLI for communications, wherein each PLI is selected from among the one or more PLIs available for use by the respective small cell.

The term "gateway (small) cell" or "grid gateway" is used herein to denote a device that routes communications (e.g. packets) both directions from a cellular network to a local network (e.g. a grid) of small cells. Preferably, the gateway cell has all the functionalities of any other cell in the small cells' network, and it is determined to be the gateway cell for the small cells' network based on its geographical proximity to a macro cell of the cellular network. In some embodiments of the present invention, the gateway cell may be used to enable handover of a UE from a macro cell to one of the other small cells belonging to the small cells' network.

According to another embodiment, the information that pertains to geographical relationship comprises measurement reports of wireless entities currently operative at the vicinity of the second plurality of small cells, wherein the measurement reports comprise information that relates to an intensity at which communication signals are received by each respective one of the receiving wireless entities, and/or the information is configuration information that relates to the one or more macro cells and their respective locations and to the small cells and their respective locations.

By yet another embodiment, the at least one small cell selected as a gateway cell, is a small cell having equal or higher reception intensity of communications signals transmitted by a base station located at the at least one macro cell identified, than any of the other small cells included in the second plurality of small cells, wherein the reception is done by mobile devices reporting the measurement reports (which are either at the vicinity of the gateway small cell or at the vicinity of the inner-grid small cells) and/or by the small cell itself when operating in a self measuring mode (i.e. while being at its "Network listen" mode).

According to another embodiment, the gateway cell is further operative to enable handover of UEs from the at least one macro cell identified, to at least one other of the second plurality of the small cells. In other words, the gateway cell is used in the HO ("hand-in") as an entry point from a macro cell to the grid comprising the second plurality of small cells.

In accordance with another embodiment, the list of one or more PLIs available for use by the gateway cell, is composed so that all PLIs included in the list are not currently used by the base station of the at least one macro cell, and by base stations of all neighbor macro cells (i.e. these PLIs are not used at any of the macro cells in the area).

By another embodiment, the step of selecting PLIs to be used in each of the small cells belonging to the second plurality of small cells, further comprises taking into account currently used (configured) PLIs in the one or more macro cells. This information may be retrieved for example by retrieving cell configuration of the at least one identified macro cell from a management system operative to manage the one or more macro cells.

In accordance with another embodiment, managing the activities comprised in steps of the method provided by the present invention is carried out by a single managing entity (e.g. a centralized self organizing network, "cSON", entity) which is connected to a management system of the one or more macro cells and to a management system of the first plurality of small cells, thereby enabling that single managing entity (e.g. the cSON) to retrieve and provide information in a synchronized manner from/to both management systems.

According to yet another embodiment, the method further comprising a step of determining the neighboring relationship between small cells belonging to the second plurality of small cells, based on the measurement reports received.

By yet another embodiment, the method further comprising a step of establishing a neighbors' list defining the geographical relationship existing between small cells belonging to the second plurality of small cells themselves, and between small cells belonging to the second plurality of small cells and the at least one macro cell.

In accordance with another embodiment, the measurement reports comprise information that relates to intensity at which communications transmitted from one or more base stations serving respective macro cells are received by a respective UE, and/or to intensity at which communications transmitted from one or more base stations serving respective small cells are received by the various UEs, and/or to intensity at which communications transmitted from a base station serving a macro cell are received at small cells belonging to the second plurality of small cells.

As will be appreciated by those skilled in the art, each UE may perform measurements and generate a measurement report that relates to signals from: one or more base stations of the macro cells, one or more base stations of the small cells or any combination thereof.

According to still another embodiment, the measurement reports comprise information that relates to intensity at which communications transmitted from one or more base stations serving respective macro cells are received at one or more of the second plurality of small cells. Preferably, according to this embodiment, the information is used for estimating the path loss between the (receiving) small cell and the (transmitting) macro cell, thereby enabling to estimate which small cell is close to which macro cell.

By yet another embodiment, the measurement reports are forwarded and stored at the network radio controller (RNC). The measurement reports are forwarded via the base station (of a macro cell or of a small cell) to which the UE is connected at the time of reporting. This information may then be used as explained hereinabove, to estimate which small cell is close to which macro cell.

According to another embodiment, the one or more PLIs available for use by the first small cell, are determined from among one or more PLIs that are not currently used by the base station of the at least one macro cell identified, and not by a base station of any of the neighboring macro cells of the identified macro cell.

By yet another embodiment, the at least one cell selected as a gateway cell is selected based on the intensity at which communications signals are received thereat and based on history data of successful hand-outs from the local network of the small cells (e.g. the grid) to the respective macro cell.

In accordance with still another embodiment, in case of adding a third small cell as an inner grid small cell belonging in that grid, the method further comprises the steps of:

detecting the third small cell (e.g. after it has been deployed and/or after it has been activated) and retrieving location information associated therewith;

identifying one or more physical layer identifiers (PLIs) that are not currently used by any of the small cells belonging to the grid to which the third small cell is being added;

configuring the third small cell with a unique PLI from among the one or more physical layer identifiers (PLIs) that are not currently used by any of the small cells belonging to the grid.

By yet another embodiment, the method further comprising creating a neighbor relations' list for each grid gateway cell associated with the selected macro cell, wherein that list comprises the allocated PLI and the Cell ID (which is a unique ID in the operator's network) or Cell Global ID (which is a globally unique ID) of the grid gateway cells.

According to another embodiment, the neighbor relations' list further comprising inner grid small cells and their association with their respective grid gateway cell.

In accordance with still another embodiment, the method further comprising a step of deleting entries in the neighbor relations' list which are the least used neighbors included in the neighbors' list of the selected macro sell, where the least used neighbors included in the neighbors' list, may be determined for example based on pre-defined threshold.

According to another embodiment, the neighbor relations' list is dynamically updated to include only small cells which are currently active.

In accordance with another aspect, there is provided a method for managing a heterogeneous cellular network comprising at least one macro cell and a plurality of small cells, comprising the steps of:

defining a geographical area and identifying all macro cells included within the defined area;

obtaining measurement reports of wireless entities currently operative within the defined area, wherein the measurement reports comprise information that relates to an intensity at which communication signals are received by each respective one of the receiving wireless entities;

based on the measurement reports obtained, establishing one or more neighbors' relations lists for groups of small cells located within all macro cells included in the defined area, by using a single cell identifier (or, cell ID) for small cells that belong to the group.

According to another embodiment of this aspect, the method further comprises a step of dynamically updating the one or more neighbors' relations lists established, in response to a change detected in future measurement reports.

In accordance with another embodiment, the measurement reports are reports are obtained every pre-defined period of time. In addition or in the alternative, the method is carried out essentially on a continuous basis, and in addition there are certain pre-defined events that when they occur, they will trigger re-assignment of PLIs. Such events may be for example activation of new macro cell, change in frequency or power settings of macro or small cell, etc.

Other aspects of the present invention such as certain features of a communication system, which is adapted to operate in accordance with the principles of the method described hereinabove, mutatis mutandis, are encompassed within the scope of the present invention.

BRIEF DESCRIPTION OF THE DRAWINGS

For a more complete understanding of the present invention, reference is now made to the following detailed description taken in conjunction with the accompanying drawings wherein.

DETAILED DESCRIPTION

Figure 1:
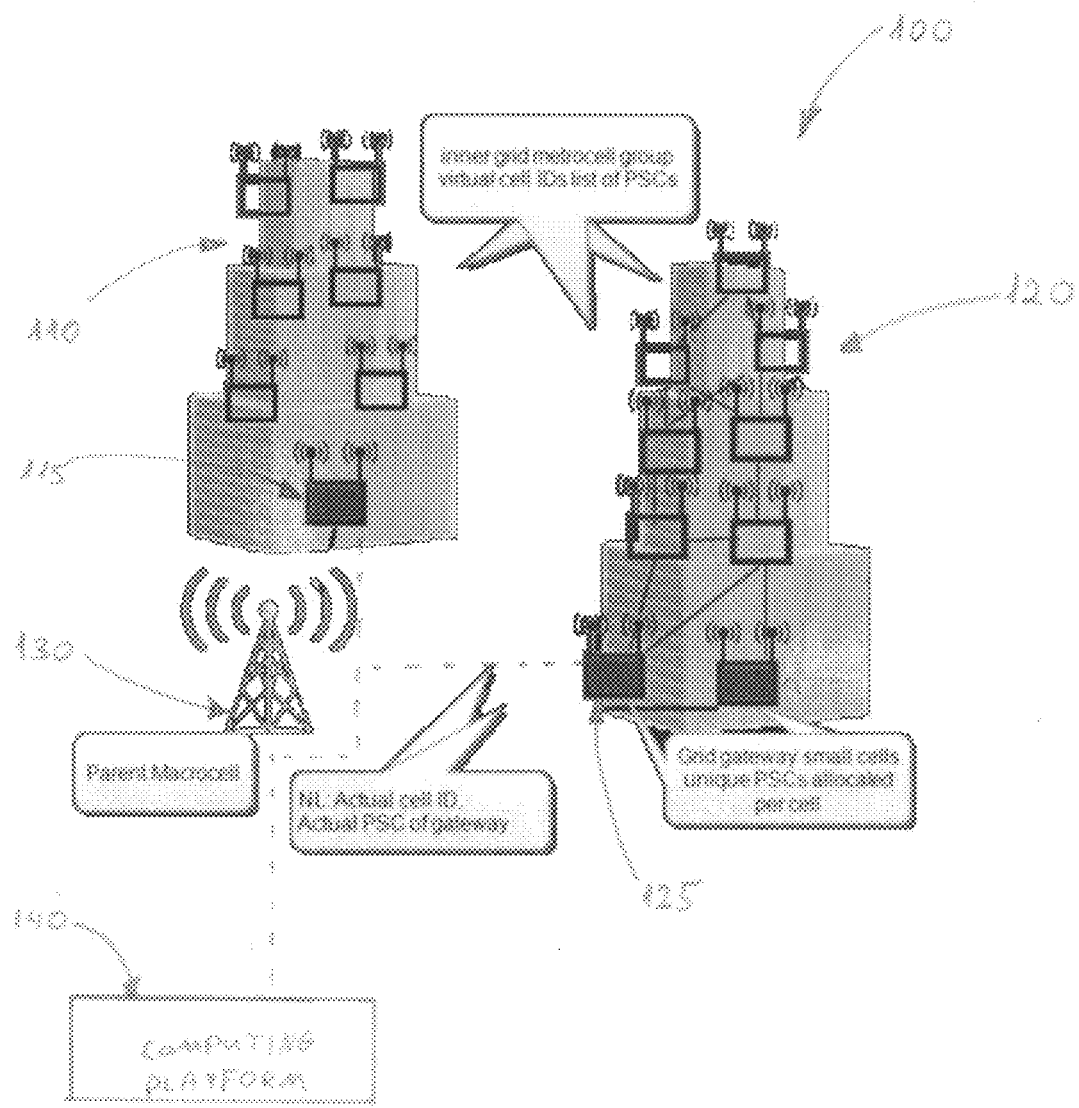
FIG. 1—is a schematic block diagram example of a system that comprises two small cell grids operative within the coverage area of a macro cell.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

A radio access network ("RAN") is part of a cellular telecommunication system. It resides between devices such as mobile phones, computers etc. and provides connection with its core network ("CN"). Typically it comprises a plurality of macro wireless cells serviced by their respective base stations and a management system that takes care after the proper function of the network (e.g. assignment of radio channels, transmission power, parameters affecting cell reselection, handovers, etc.).

However, as previously explained, network operators have started in the recent years to form small cells by installing metro/micro/pico devices in public places and Femto devices that are used as personal cellular sites. These devices typically have an antenna as well as an Internet connection. The Femto devices may use the end user Internet connection to connect to the service provider's network and to route the user's phone calls.

With mass market deployment of small cells, the number of cells, as well as density of cells will increase significantly, with each cell covering a much smaller area. Therefore, more neighbors' management is required with neighbors' lists to be negotiated and managed across the small cells as well as the macro network (i.e. the het net).

Having the proper neighbors' relations from the macro cells to the small cells is critical for both efficient utilization of the small cell layer as well as for improving the mobility robustness in the het net. Updated neighbors lists are required in the macro network for both idle mode reselection and active handover to enable hand-in from the macro network to the small cells via gateway cells (such as a small cell located in a building entrance, as opposed to cells located at higher floors). Another aspect which relates to the management of heterogenic networks is associated with creating neighbors relations between the macro network and a group of cells, in order to enable a high PLIs reuse. The method practiced in macro network of creating one-to-one relations will not be feasible in this situation, as one would require identifying and allocating free PLIs that can be used by the increasing number of small cells being deployed within a given area, without causing scrambling code collisions.

In order to address these problems, the solution provided by the present invention may be used to provide automatic detection of new small cells being deployed, and a way to associate these small cells to a "reference cluster" of macro cells.

Let us first consider FIG. 1, which illustrates a schematic block diagram example of system 100 that comprises two small cell grids 110 and 120, each located at a different house, wherein these two grids are operative within the coverage area of a macro cell being serviced by base station 130.

The small cells included in each of the two small cell grids, namely 110 and 120, is classified into grid gateway cells, 115 and 125 in the present example, which are operative to interact with their respective macro cell, and inner grid small cells which do not—e.g. indoor cells. Grid gateway cells are identical to other small cells, but are generally placed at a location that allows handover ("hand in") from the macro cell to the small cell grid. For example, for indoor deployment, the grid gateway cells will be typically located in the building entrance, while the small cells located on higher floors of the building will be inner grid cells and will not be target for hand-in from the macro. For outdoor deployment the grid gateway cells may be the cells along the road to a neighborhood not covered by the macro network.

In order for these small cells to properly operate, there is a need to dynamically allocate/assign a suitable PLIs to the various inner grid small cells, while ensuring that these codes to not collide with those of the macro cells operating at a distance short enough to induce interferences to their operation, when the same PLI is used by the macro cell. These PLIs are selected preferably from a list comprising available PLIs; the list may include less PLIs than the number of small cells. In addition, individual unique PLIs are selected for grid gateway cells, in order to enable hand-in of a mobile terminal moving from the macro cell network to the small cell grid network.

Thus, a computing platform 140 which comprises a processor is used to optimize assignment of scrambling codes to each of the various small cells. The computing platform is operative to check for new small cells being deployed and to synchronize their operation with the small cells Operation Support System ("OSS"). The computing platform is preferably operative to enable dynamic (ongoing) optimization of the PLIs being allocated to the small cells (also known as metro cells) to prevent collision and/or confusion between PLIs assigned to macro cells and to small cells.

First, the computing platform classifies small cells that are associated (e.g. located at the vicinity of) with macro cells as being gateway cells, which, as explained above be used for the "hand in" process—handing the call over from the macro network to the metro (small) cell grid, whereas other small cells will be classified as inner grid cells.

Figure 2:
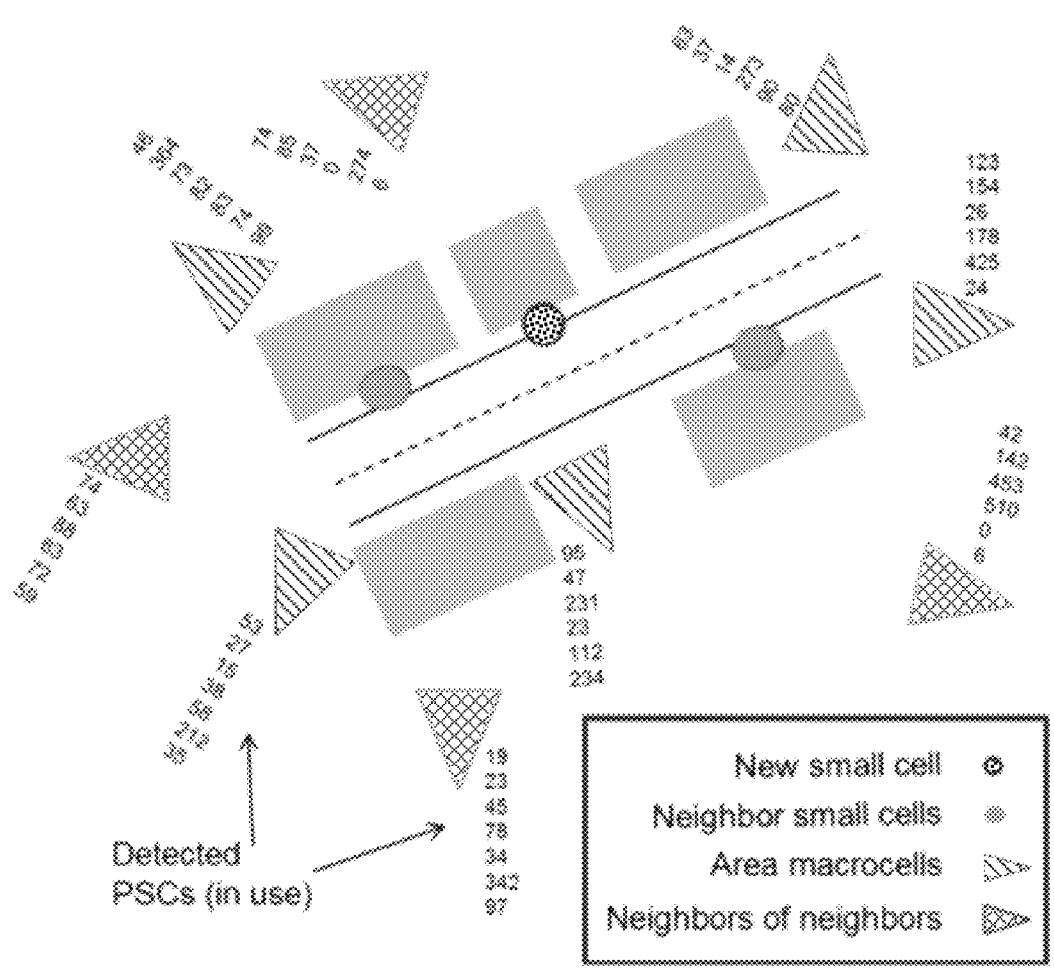
FIG. 2—illustrates a method for applying measurements from UE's linked to macro cells in order to identify additional PLIs that are available for use.

Then, the computing platform detects free (available) PLIs that can be used by the small cells, by checking the scrambling codes allocated to the macro cells in a cluster, one which preferably includes neighboring cells, and neighbors of the neighboring cells. In addition, the computing platform (which may be implemented for example as an application) applies measurements from user equipments ("UE's") that are linked to cells of the macro reference cluster, in order to identify additional PLIs that are available for use within that area as demonstrated in FIG. 2.

Preferably, no use should be made in inner cells of a) any PLI allocated to any of the surrounding macro cells, and b) of any PLI allocated to the relevant gateway cell(s). Preferably, one PLI may be used by more than one inner small cell ("PLI reuse").

The actual list of PLIs may be based on a configurable operator policy by which the acceptable RF thresholds in the area are determined. An example for such determination is illustrated in the following Table 1:

TABLE 1

| PSC ID | Number of missing neighbor events | Average RSCP | Average Ec/No |
|---|---|---|---|
| 121 | 0 | 0 | 0 |
| 28 | 0 | 0 | 0 |
| 54 | 0 | 0 | 0 |
| 83 | 10 | −104 dBm | −18 dBm |
| 65 | 45 | −101 dBm | −16 dBm |
| 48 | 68 | −102 dBm | −17 dBm |
| 74 | 71 | −102 dBm | −16 dBm |
| 341 | 87 | −101 dBm | −17 dBm |

According to the example presented in this table, PSCs 121, 28 and 54 are free, as no UE reports them as missing neighbors. PSCs 83, 65, 48, 74 and 341 have been reported by some UEs in the area as being missing neighbors, but they were received at average RSCP and Ec/No levels which are low enough (according to thresholds defined by the operator) so that they can be allocated for use by small cells.

Such configurable thresholds allow finding free PSCs that may be assigned for small cells. For example, when the small cells are deployed indoors, these thresholds can be set to take into account also the outdoor-to-indoor penetration loss, thereby enabling the use of a PSC that otherwise would not have been used due to its potential interference.

Figure 3:
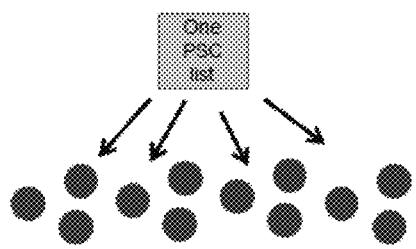
FIG. 3—exemplifies a prior art solution which is based on setting a single "static" PLI list for all small cells to be found in the HetNet.

The computational platform allocates an optimal PSC list for the inner grid small cells, say a list of up to 16 PSCs (the number is configurable, according to the capability of the small cell), out of which each small cell will automatically select an available PSC based on its network scan. This allows for automatic self-organization of the small cells in a "grid", where each small cell senses its neighboring small cells during the scan, and selects a PSC (out of the list) which is not currently in use within its own area. The allocation of additional PSCs reduce the chance for PSC collision within the small cells' grid, as opposed to prior art solutions, which set a single static PSC list (e.g. through the configuration profile) for all small cells to be found in the HetNet, as illustrated in FIG. 3. Since typically it is not possible to "carve out" many PSCs for small cell use within the entire network, this list would have fewer PSCs resulting in higher probability of PSC collision within the grid and consequently would lead to reduced grid performance.

Figure 4:
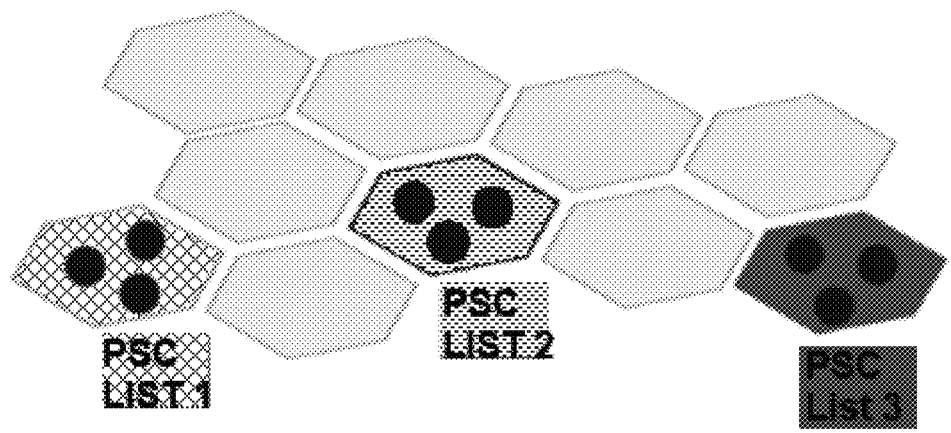
FIG. 4—exemplifies an embodiment of the method provided by the present invention for automatically creating an optimal PLI list per a given area.

The solution provided by the present invention as demonstrated in FIG. 4 allows for automatic creation of an optimal PLI list per a given area (e.g. to be based on macro "parent" cell resolution, rather than on the entire network). Therefore, it is possible to find and assign more PLIs for the small cells, while reducing the risk for PLI collision, thereby enhancing the grid performance.

Preferably, in order to allocate non-ambiguous PLIs for grid gateway cells, the computational platform disables the PLI selection mechanism of the small cells and allocates for each of the small cell an individual unambiguous PLI, out of PLIs detected as being unused PLIs. Once such a PCS is assigned to a grid gateway cell, it may be used thereafter for hand-in procedure, when a UE moves from the macro network to the small cell grid network.

Preferably, the computational platform continuously checks for actual and potential scrambling code collisions by monitoring the scrambling codes of the cells in the extended reference cluster defined above (e.g. the neighboring macro cells, and their neighboring macro cells), and by analyzing dropped calls. In cases of collisions, the computational platform may recalculate and reassign the required PLIs for the small cells located in the area of reference.

Figure 5:
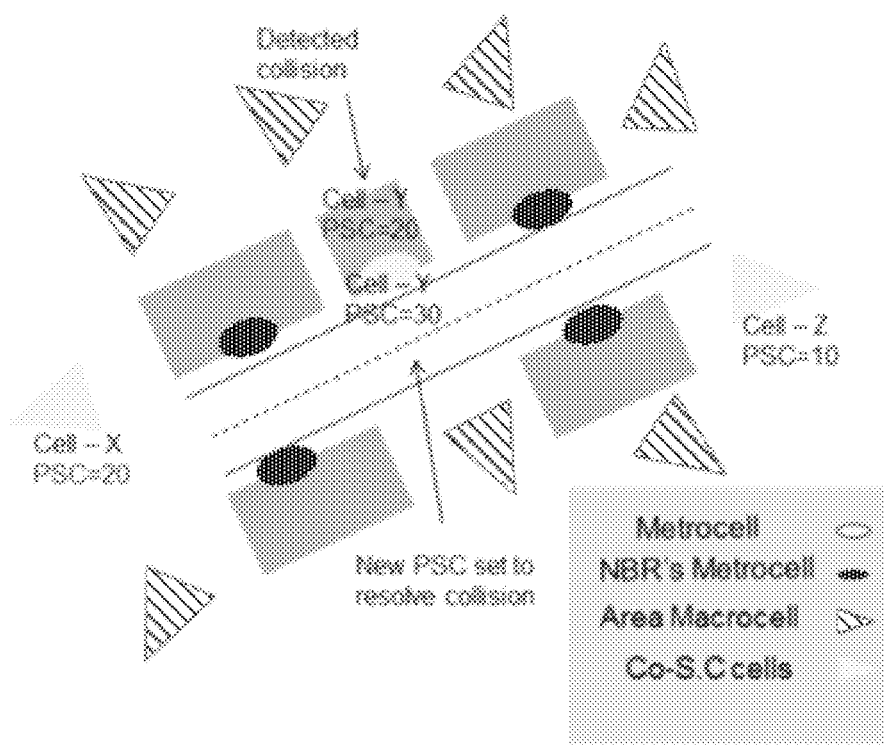
FIG. 5—illustrates an example for a PLI collision resolution by the computational platform of the present invention.

FIG. 5 illustrates an example for a PSC collision resolution by the computational platform. Let us assume that in this example, PSC=20 was available in the area illustrated in FIG. 5, and was allocated by the computational platform to cell Y. Now, a new macro site (cell X) has been deployed, and configured to use the very same PSC. The computational platform detects that both cell X and cell Y are now using PSC=20 and recalculates the free PSC list in the area. Following this recalculation, the computational platform is able to change (or rather propose a change) of the PSC for cell Y from PSC=20 to PSC=30. In this example, cell Y is a grid gateway cell having a unique PSC allocation.

Similar PSC collision resolution may occur also for inner grid cells. In case the computational platform detects that a PSC it has assigned in the PSC list for small cells is no longer available (free), a new PSC list would be calculated and applied in order to provide the inner grid cells with a new PSC.

Figure 6:
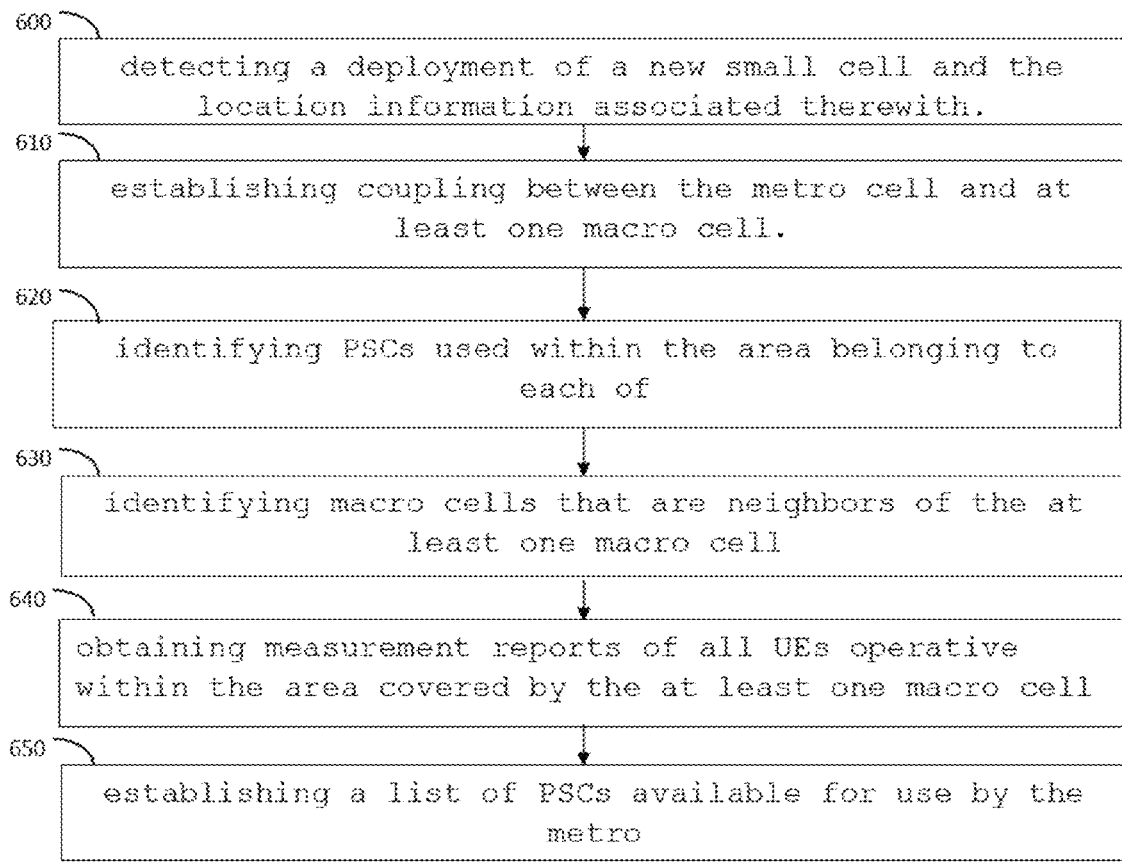
FIG. 6—exemplifies an embodiment of a method for carrying out a certain aspect of present the invention.

The following example (FIG. 6) illustrates one embodiment of a method for carrying out the present invention. In an heterogeneous RAN ("Het Net") comprising at least one macro cell and a plurality of small cells, the following steps are taken in order to enable dynamic assignment of PSCs to the small cells while eliminating or at least minimizing conflicts that might arise (scenarios of collisions and/or confusion) due to the use of the same PSC by two or more transmitting entities.

Step 600: detecting a deployment of a new small cell (i.e. a metro cell) and the location information associated therewith.

Step 610: establishing coupling between the metro cell and at least one macro cell, wherein the metro cell may be subjected to interferences induced by the base station(s) serving the at least one macro cell.

Step 620: identifying PSCs used within the area belonging to each of the at least one macro cell by the respective base station(s) of the at least one macro cell and the base station of the metro cells.

Step 630: identifying macro cells that are neighbors of the at least one macro cell.

Step 640: obtaining measurement reports of all UEs operative within the area covered by the at least one macro cell.

Step 650: establishing a list of PSCs available for use by the metro cell.

Step 660: configuring the metro cell with a unique PSC from among the established list, thereby allowing that metro cell to serve as a gateway for carrying out a handover procedure for a UE moving between the macro cell and one of the metro cells belonging to the grid to which that metro cell belongs.

According to an embodiment of the invention, a group of inner-grid small cells is included in the neighbors' relations list under a single entry associated with a single PLI (e.g. a single PSC).

In summary, a major drawback of prior art solutions relating to the use of small cells, is their inability to accurately plan PLIs for small cells, and that they do not enable finding enough free PLIs within dense areas. The solution provided by the present invention on the other hand, offers the ability to use real measurements taken from UEs connected to the macro cells in the specific location and optionally real measurements taken from UEs connected to the small cells in that specific location, for obtaining accurate detection of free PLIs. The PLI lists are created dynamically per area, and do not require reserving codes on a network level for use by the small cells.

Implementing configurable policy (e.g. thresholds for RSCP, Ec/No and frequency of missing neighbor events) enables finding and allocating additional available PLIs for indoor small cells. Thus, the solution provided by the present invention allows automatic configuration of scrambling codes for new and existing small cells in the network.

Figure 7:
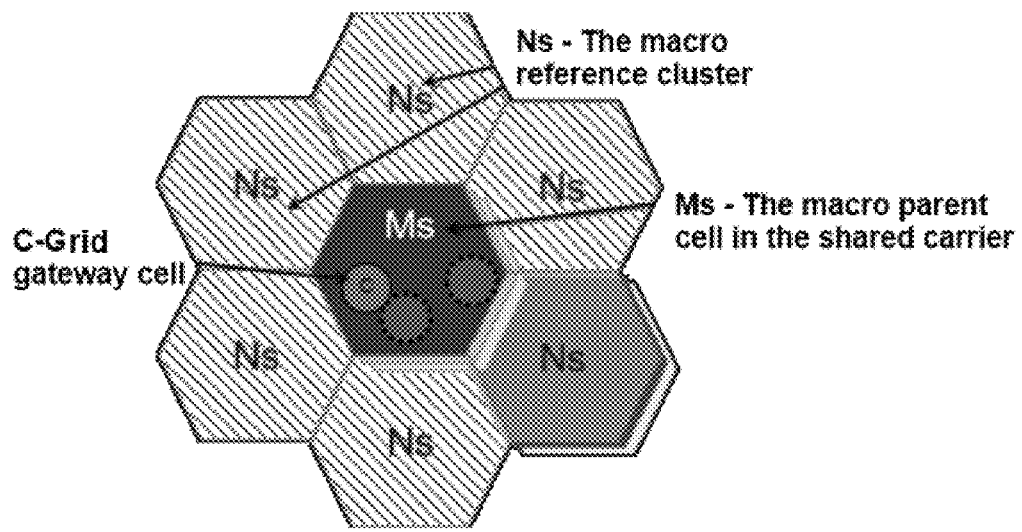
FIG. 7—exemplifies a HetNet comprising a small cell grid, the parent macro cell and a macro cell cluster.

According to another embodiment the processor of the computational platform (or of a different computational platform) is further operative to establish a neighbor relations' list that matches the actual PLI allocation provided by the computational platform, in a HetNet as illustrated for example in FIG. 7. These neighbors' relations are automatically and dynamically created by the computational platform for the macro cells to allow UEs to re-select and perform handover to the small cells. Thus the device and the application for creating and maintaining neighbors' lists provided by this embodiment, allow reselection and handover between macro cells and small cell grids in the area.

By this embodiment, the allocation of PLIs for the small cells takes into consideration not only the PLIs which are available for use, but also the available macro neighbors' list entries. The actual number of allocated PLIs may be less than the detected available PLIs. For example, because of size restrictions imposed on the neighbors' list by the air interface standard or in accordance with the configurable operator policy. Following this embodiment allows the operator to provide enhanced mobility robustness and QoE in HetNets as those described above.

Figure 8:
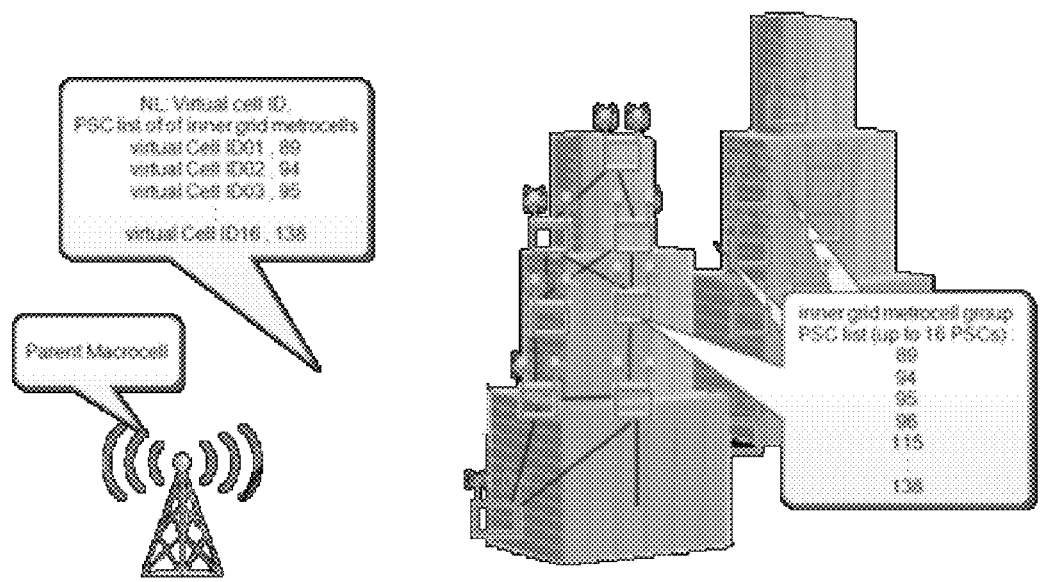
FIG. 8—illustrates the use of a general neighbor relations list defined between the serving macro cells and a group of inner-grid small cell.

An example of neighbors' relations between serving macro cells and inner-grid small cells is shown in FIG. 8. The creation and maintenance of the neighbors' lists may be carried out according to the following steps:

(1) Checking for new small cells in the network by synchronizing with the small cells' Operating Support System ("OSS"). When a new small cell is identified the application automatically identifies the macro "parent" cell(s) using a combination of geographic location and small cell measurements.

(ii) Classifying the small cells as being grid gateway cells or inner grid cells. As explained above, the grid gateway cells will be used for the 'hand in' process, i.e. handing the call (data connection) over from the macro cells to the small cells comprised in the inner grid. In the example of an in-building deployment—the grid gateway cell(s) would typically be located at the entry to the building, and the "inner grid" cells would be located on the different floors/areas of the building.

Creating Neighbors' Lists

The device (or software application as the case may be) creates a non-ambiguous neighbor's relation (list) to each grid gateway cell in the macro "parent" cell (the macro cell to be associated therewith). This neighbors' relation would be created with the allocated PLI and the actual cell ID of the grid gateway cell. Relations to the inner grid cells (according to the allocated PLI list) are added using "virtual cell IDs" i.e. Cell IDs allocated by the operator for groups of small cells in the area.

The processor operative to create and maintain the neighbors' list takes air interface limitations into account when creating the neighbor relations, and where necessary, clears room in the neighbor list by removing the least used neighbor relations from the "parent" cell's neighboring list ("NL"). The operator may control the neighbors' deletion by defining a threshold for allowing such deletion of an existing relation. The processor creates the right neighbors' relations only when they are indeed relevant—i.e. only when small cells have been actually been deployed, and/or only when they are active. This way, the processor avoids deletion of existing neighbors' relations in areas where no small cells are deployed, which in-turn could increase the Drop-Call Rate (DCR).

The total number of neighbors that can be stored in a Neighbors' List ("NL") is limited, and already contains inter, intra and IRAT neighbors. Implementing a small cells solution require adding the small cells located in the area to the existing neighbors' lists to allow handover/reselection.

According to prior art solution, the operators can choose one of the following methods:
1. To add manually small cell neighbors to the macro cells when (or near) the small cell are deployed, i.e. when the small cells are introduced to the network. The major drawback of this method is that it is not scalable for mass deployment of small cells.
2. To create the same small cells' neighbor relations for every neighbors' list across the entire heterogeneous network. This approach can be used only if a large enough set of PLIs could have been "carved out" from the macro throughout the entire het net (which is typically not the case). This approach means deleting other neighbor relations throughout the entire network, including in areas where no small cells are deployed, which may cause unnecessary DCR increase.
3. The operators may also manually create neighbor relations to the grid gateway cells. However, this solution is also not scalable, and is prone to errors.

When used without the PLI allocation for the small cells functionality, as may be done according to an embodiment of the present invention, neighbors' relations are automatically created to groups of small cells, using virtual cell IDs, located within all macro cells in a defined area. The area can be defined for example by the operator, thus limiting the additional relations to areas where small cells deployment is planned and the operator has enough knowledge about.

However, when implemented together with the PLI allocation for the small cells functionality—grid gateway cells are identified, and a unique neighbor relation from the "parent" macro cell is created to enable hand-in from the macro (cellular) network. In the alternative, one can have the solution of the present invention implemented by only creating relations per actual physical layer identifiers (PLIs) allocated for small cells under the macro site. This will optimize the number of neighbors allocated in the macro cell and will avoid needlessly deleting other neighbor relations in areas where small cells have not been deployed. The processor operative to create and maintain the neighbors' list notifies the processor responsible for the PSC allocation for the small cells functionality on the number of neighbor relations can be created within the macro cell (to meet air interface limitation and the defined operator policy) such that PSC list would be allocated accordingly. It should be noted, that in dense urban areas less PSCs and less entries in the NL are expected to be available. The processor operative to create and maintain the neighbors' list will only create relations to allocated PSCs and will delete fewer entries in the macro cells. Relations will be deleted only if the frequency of their usage is below a configurable threshold.

In summary, the prior art solutions are unable to accurately plan neighbor relations between macro cells, and small cells, as these lists are dynamic in nature, and require a case-by-case examination in order to allocate the optimal number of small cell neighbors, and to identify grid gateway cells.

The embodiment provided by the present invention when the functionality of creating and maintaining the neighbors' list is operative in conjunction with the PLI allocation for the small cells functionality for managing heterogeneous networks provides consistent, up to date optimal neighbor relations for the small cells deployed under macro network produced by any vendor. It enables smooth handover via grid gateway cells, and reselection of any small cell, with minimal impact on the neighbor lists of the macro network.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for managing a heterogeneous cellular network ("HetNet") comprising one or more macro cells and a first plurality of small cells, wherein the method comprises the steps of:

providing a second plurality of small cells belonging to the first plurality of small cells;

obtaining information that pertains to geographical relationship between at least one of the one or more macro cells and the second plurality of small cells;

based on the information obtained, identifying at least one macro cell from among the one or more macro cells, located at a geographical vicinity of at least one of the second plurality of small cells;

selecting at least one small cell from among said second plurality of small cells to be a gateway cell, and selecting at least one other small cell of the second plurality of small cells to be an inner cell, and wherein the selection of the at least one cell as a gateway cell is based upon reception intensity at which communication signals transmitted by a base station located at the at least one macro cell identified, are received;

identifying physical layer identifiers (PLIs) used at the at least one macro cell identified;

for a frequency carrier at which the gateway cell is operative, determining one or more PLIs available for use by the gateway cell, wherein the one or more available PLIs are not currently used by the base station of the at least one macro cell at that frequency carrier;

determining one or more PLIs available for use by the at least one inner small cell; and selecting for each of the at least one gateway cell and for each of the at least one inner cell, a PLI to allocate for communications for each of the at least one gateway cell and for each of the at least one inner cell, wherein each PLI is selected from among the one or more PLIs available for use by each of the at least one gateway cell and by each of the at least one inner cell.

2. The method of claim 1, wherein the information that pertains to geographical relationship comprises measurement reports of wireless entities currently operative at the vicinity of the second plurality of small cells, wherein the measurement reports comprise information that relates to an intensity at which communication signals are received by each respective one of the receiving wireless entities, and/or configuration information that relates to the one or more macro cells and their respective locations and to the small cells and their respective locations.

3. The method of claim 2, wherein the at least one small cell selected as a gateway cell is a small cell having equal or higher reception intensity of communications signals transmitted by a base station located at the at least one macro cell identified than any of the other small cells included in the second plurality of small cells, wherein the reception is made by mobile devices reporting the measurement reports and/ or by the small cell itself when operating in a self measuring mode.

4. The method of claim 1, wherein managing the steps comprised in said method is carried out by a single managing entity connected simultaneously to a management system of the one or more macro cells and to a management system of the first plurality of small cells, thereby enabling said single managing entity to retrieve and provide information in a synchronized manner from/to both management systems.

5. The method of claim 4, wherein the step of selecting a PLI for each of the at least one gateway cell and for each of the at least one inner cell, further comprises retrieving from a management system operative to manage the one or more macro cells, the configuration of the at least one identified macro cell.

6. The method of claim 2, further comprising a step of determining the neighboring relationship between small cells belonging to the second plurality of small cells, based on the measurement reports received.

7. The method of claim 1, further comprising a step of establishing a neighbors' list defining the neighbor relationship existing between small cells belonging to the second plurality of small cells themselves, and between small cells belonging to the second plurality of small cells and the at least one macro cell.

8. The method of claim 2, wherein the measurement reports comprise information that relates to intensity at which communication signals transmitted from one or more base stations serving respective macro cells are received by a respective UE, and/or to intensity at which communications transmitted from one or more base stations serving respective small cells are received by a respective UE, and/or to intensity at which communications transmitted from a base station serving a macro cell are received at one or more small cells belonging to the second plurality of small cells.

9. The method of claim 1, wherein the one or more PLIs available for use by the first small cell, are determined from among one or more PLIs that are not currently used by the base station of the at least one macro cell identified, and not by a base station of any of the neighboring macro cells of the identified macro cell.

10. The method of claim 1, wherein in case of adding a third small cell as an inner grid small cell belonging in that grid, the method further comprises the steps of:
    detecting the third small cell and retrieving location information associated therewith;
    identifying one or more physical layer identifiers (PLIs) that are not currently used by any of the small cells belonging to the grid to which the third small cell is being added; and
    configuring the third small cell with a unique PLI from among the one or more PLI that are not currently used by any of the small cells belonging to the grid.

11. The method of claim 1, creating a neighbor relations' list for each grid gateway cell associated with the selected macro cell, wherein said list comprises the allocated PLI and the actual cell ID of said grid gateway cells.

12. The method of claim 10, further comprising a step of deleting entries in the neighbor relations' list which are the least used neighbors included in the neighbors' list of the selected macro cell, where the least used neighbors included in the neighbors' list are determined based on pre-defined threshold.

13. The method of claim 10, wherein the neighbor relations' list is dynamically updated to include only small cells which are currently active.

14. One or more non-transitory computer readable media comprising instructions for execution that when executed by a processor are operable to perform operations for managing a heterogeneous cellular network ("HetNet") comprising one or more macro cells and a first plurality of small cells, the operations comprising:
    providing a second plurality of small cells belonging to the first plurality of small cells;
    obtaining information that pertains to geographical relationship between at least one of the one or more macro cells and the second plurality of small cells;
    based on the information obtained, identifying at least one macro cell from among the one or more macro cells, located at a geographical vicinity of at least one of the second plurality of small cells;
    selecting at least one small cell from among said second plurality of small cells to be a gateway cell, and selecting at least one other small cell of the second plurality of small cells to be an inner cell, and wherein the selection of the at least one cell as a gateway cell is based upon reception intensity at which communication signals transmitted by a base station located at the at least one macro cell identified, are received;
    identifying physical layer identifiers (PLIs) used at the at least one macro cell identified;
    for a frequency carrier at which the gateway cell is operative, determining one or more PLIs available for use by the gateway cell, wherein the one or more available PLIs are not currently used by the base station of the at least one macro cell at that frequency carrier;
    determining one or more PLIs available for use by the at least one inner small cell; and
    selecting for each of the at least one gateway cell and for each of the at least one inner cell, a PLI to allocate for communications for each of the at least one gateway cell and for each of the at least one inner cell, wherein each PLI is selected from among the one or more PLIs available for use by each of the at least one gateway cell and by each of the at least one inner cell.

15. The media of claim 14, wherein the information that pertains to geographical relationship comprises measurement reports of wireless entities currently operative at the vicinity of the second plurality of small cells, wherein the measurement reports comprise information that relates to an intensity at which communication signals are received by each respective one of the receiving wireless entities, and/or configuration information that relates to the one or more macro cells and their respective locations and to the small cells and their respective locations.

16. The media of claim 14, wherein the step of selecting a PLI for each of the at least one gateway cell and for each of the at least one inner cell, further comprises retrieving from a management system operative to manage the one or more macro cells, the configuration of the at least one identified macro cell.

17. The media of claim 14, the operations further comprising a step of establishing a neighbors' list defining the neighbor relationship existing between small cells belonging to the second plurality of small cells themselves, and between small cells belonging to the second plurality of small cells and the at least one macro cell.

* * * * *